(12) United States Patent
Wood (10) Patent No.: US 11,221,930 B2
(45) Date of Patent: *Jan. 11, 2022

(54) SYSTEMS AND METHODS FOR SIMULATION-BASED REPLAY OF INTEGRATED DEVICES

(71) Applicant: Worldpay, LLC, Symmes Township, OH (US)

(72) Inventor: Jared Wood, Chandler, AZ (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/704,125

(22) Filed: Dec. 5, 2019

(65) Prior Publication Data
US 2020/0110680 A1    Apr. 9, 2020

Related U.S. Application Data

(63) Continuation of application No. 15/837,449, filed on Dec. 11, 2017, now Pat. No. 10,534,680.

(51) Int. Cl.
| | | |
|---|---|---|
| *G06F 11/26* | (2006.01) | |
| *G06F 9/54* | (2006.01) | |
| *G06F 11/22* | (2006.01) | |
| *G06F 11/34* | (2006.01) | |
| *G06Q 20/20* | (2012.01) | |

(52) U.S. Cl.
CPC ............. *G06F 11/26* (2013.01); *G06F 9/547* (2013.01); *G06F 11/2205* (2013.01); *G06F 11/3414* (2013.01); *G06F 11/3466* (2013.01); *G06Q 20/206* (2013.01)

(58) Field of Classification Search
CPC ............... G06F 11/3414; G06F 11/261; G06F 11/3466; G06F 11/3476; G06F 11/3688; G06F 11/26; G06F 11/2205; G06F 9/547; G06Q 20/206
See application file for complete search history.

(56) References Cited

U.S. PATENT DOCUMENTS

| | | | | |
|---|---|---|---|---|
| 9,799,021 | B1 * | 10/2017 | Lee | ........................ G06Q 20/204 |
| 2009/0006066 | A1 * | 1/2009 | Behm | .................... G06F 11/261 |
| | | | | 703/15 |
| 2010/0251032 | A1 * | 9/2010 | Macary | ............... G06F 11/3414 |
| | | | | 714/38.14 |
| 2014/0282407 | A1 * | 9/2014 | Channamsetti | ........ G06Q 10/06 |
| | | | | 717/124 |
| 2017/0148021 | A1 * | 5/2017 | Goldstein | ........... H04L 63/0281 |

* cited by examiner

*Primary Examiner* — Jigar P Patel
(74) *Attorney, Agent, or Firm* — Bookoff McAndrews, PLLC (57) ABSTRACT

A method of simulating device state changes in an integrated system includes receiving a transaction request from a client device, storing the transaction request as a first event in an event log, transmitting the transaction request to a terminal device, storing the transmission of the transaction request as a second event in the event log, receiving a device response from the terminal device, storing the device response as a third event in the event log, and when the integrated system is under test, a simulator replays the stored events in the integrated system under test.

20 Claims, 8 Drawing Sheets

SYSTEMS AND METHODS FOR SIMULATION-BASED REPLAY OF INTEGRATED DEVICES

CROSS-REFERENCE TO RELATED APPLICATION(S)

This patent application is a continuation of and claims the benefit of priority to U.S. application Ser. No. 15/837,449, filed on Dec. 11, 2017, which is incorporated herein by reference in its entirety.

TECHNICAL FIELD

Various embodiments of the present disclosure relate generally to integrated payment solutions and, more particularly, to providing simulation-based replays of integrated device interactions.

BACKGROUND

Traditionally, merchants and other store owners have point of sale (POS) terminals and POS systems that can accept check or payment card payments from consumers for goods and services. Such POS systems interact with integrated devices (e.g., PIN pads) at which a consumer may enter payment and/or personal information in order to complete payment processing requests for purchases. The POS systems generally interact with the integrated devices by way of bi-directional communication involving Application Programming Interface (API) requests and responses. The interactions between the requests and responses sometimes result in unexpected behavior that requires some form of technical remediation. Current forms of technical remediation are inefficient and may cause inconvenience and dissatisfaction for the merchant and the merchant's customers, possibly resulting in decreased revenue for the merchant.

The present disclosure is directed to overcoming one or more of these above-referenced challenges.

SUMMARY OF THE DISCLOSURE

According to certain aspects of the disclosure, systems and methods are disclosed for simulating device state changes in an integrated system.

In one embodiment, a computer-implemented method is disclosed for simulating device state changes in an integrated system. The method includes: receiving a transaction request from a client device, storing the transaction request as a first event in an event log, wherein the first event is associated with a correlation ID, transmitting the transaction request to a terminal device, storing the transmission of the transaction request as a second event in the event log, wherein the second event is associated with the correlation ID, receiving a device response from the terminal device, storing the device response as a third event in the event log, wherein the third event is associated with the correlation ID, generating a test definition ID based on the correlation ID and the first event, and storing the test definition ID in a test repository, wherein when the integrated system is under test, transmitting the correlation ID and the test definition ID to a simulator, wherein the simulator replays the first event in the integrated system under test.

According to certain aspects of the disclosure, non-transitory computer readable media are disclosed storing a program causing a computer to execute a method of simulating device state changes in an integrated system. One method comprises: receiving a transaction request from a client device, storing the transaction request as a first event in an event log, wherein the first event is associated with a correlation ID, transmitting the transaction request to a terminal device, storing the transmission of the transaction request as a second event in the event log, wherein the second event is associated with the correlation ID, receiving a device response from the terminal device, storing the device response as a third event in the event log, wherein the third event is associated with the correlation ID, generating a test definition ID based on the correlation ID and the first event, and storing the test definition ID in a test repository, wherein when the integrated system is under test, transmitting the correlation ID and the test definition ID to a simulator, wherein the simulator replays the first event in the integrated system under test.

In accordance with another embodiment, a system is disclosed for simulating device state changes. The system comprises: a memory having processor-readable instructions stored therein; and a processor configured to access the memory and execute the processor-readable instructions, which when executed by the processor configures the processor to perform a plurality of functions, including functions to: receive a transaction request from a client device, store the transaction request as a first event in an event log, wherein the first event is associated with a correlation ID, transmit the transaction request to a terminal device, store the transmission of the transaction request as a second event in the event log, wherein the second event is associated with the correlation ID, receive a device response from the terminal device, store the device response as a third event in the event log, wherein the third event is associated with the correlation ID, generate a test definition ID based on the correlation ID and the first event, and store the test definition ID in a test repository, wherein when the integrated system is under test, transmit the correlation ID and the test definition ID to a simulator, wherein the simulator replays the first event in the integrated system under test.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that a variable number of transaction command generators may be available for servicing transaction requests and the transaction command generators provide support for application programming interfaces of differing client devices. The disclosed systems and methods discussed below may allow greater throughput and scalability of the payment processing system.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to providing simulation-based replays of integrated device interactions.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

A merchant payment processing system may typically include one or more point of sale (POS) terminals in communication with one or more personal identification number (PIN) pads. Once a customer's transaction entered at the POS device is ready for completion, the POS device may send commands to a PIN pad for interaction with the customer to complete the transaction. This interaction may include presentation of payment credentials, such as a payment vehicle, and entry of customer identification, such as a PIN, biometric information, etc. Each POS device will maintain communication with the associated PIN pad in order to ensure that a customer can complete the transaction. Desirably, in order to allow a flexible association between a PIN pad and POS device, each PIN pad may connect to the merchant's payment processing system through a gateway. For example, the merchant's payment processing system may be accessible in a cloud environment rather than by a direct connection from the PIN pad. Thus, a PIN pad may not be directly linked with a particular POS device.

Figure 6:
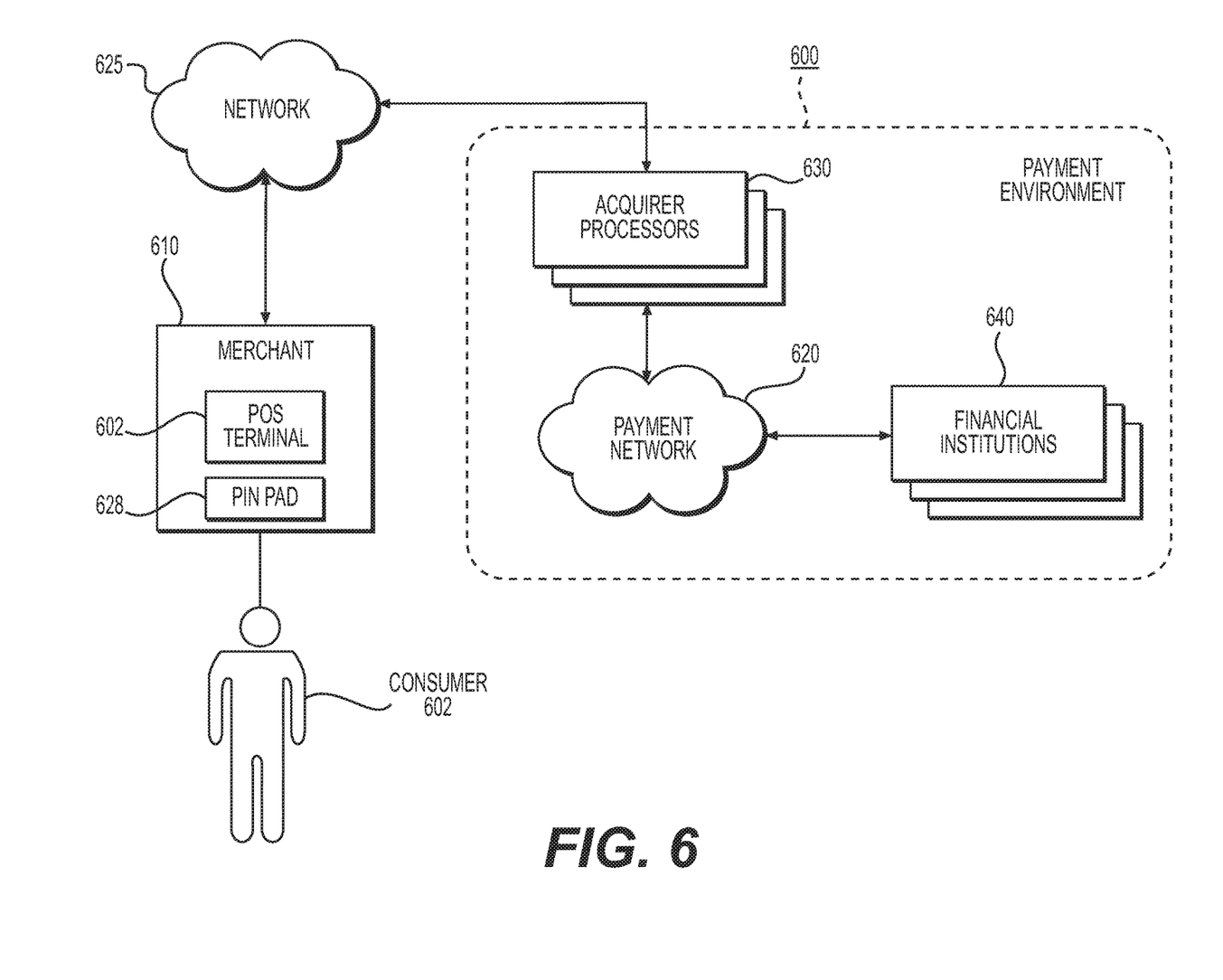
FIG. 6 depicts a block diagram of an electronic payment processing system.

As shown in FIG. 6, in an electronic payment processing system, a consumer 602, during the checkout process with a merchant 610, pays for goods or services from merchant 610 at a PIN Pad 628 associated with POS terminal 602. Consumer 602 may use a payment card as payment and the transaction is processed through a payment environment 600. Because merchant 610 generally can use a different bank or financial institution 640 than consumer 602, an acquirer processor 630 handles the financial transactions that transfer payment between the financial institution 640 of consumer 602 and that of merchant 610. Consumer 602 submits payment information at the PIN Pad 628 associated with POS terminal 602 of merchant 610, such as by swiping his or her payment card, inserting his or her chip-based payment card, through wireless near field communication (NFC), etc., or by any other suitable means. PIN Pad 628 sends a payment request by way of a computer network 625 to an acquirer processor 630. Alternatively, such a request may be sent by a component that controls a flow of a transaction, such as client core engine 106 depicted in FIG. 1B. Acquirer processor 630 requests, by way of payment network 620, an electronic transfer of funds from the received funds to the financial institution 640 associated with merchant 610.

In some cases, the bi-directional communication between POS terminal 602 and PIN PAD 628 result in unexpected behavior. For example, a malformed request from POS terminal 602 may generate an error in response from PIN PAD 628. In order to diagnose and remediate the errors, technical personnel may generally rely on ineffective and/or inefficient methodologies (e.g., user reports) for recreating the interactions that led up to the error. The present disclosure is therefore directed to providing a more effective solution for remediating errors that result during an interaction between a client (e.g., POS terminal) and a device (e.g., PIN PAD).

Figure 1A:
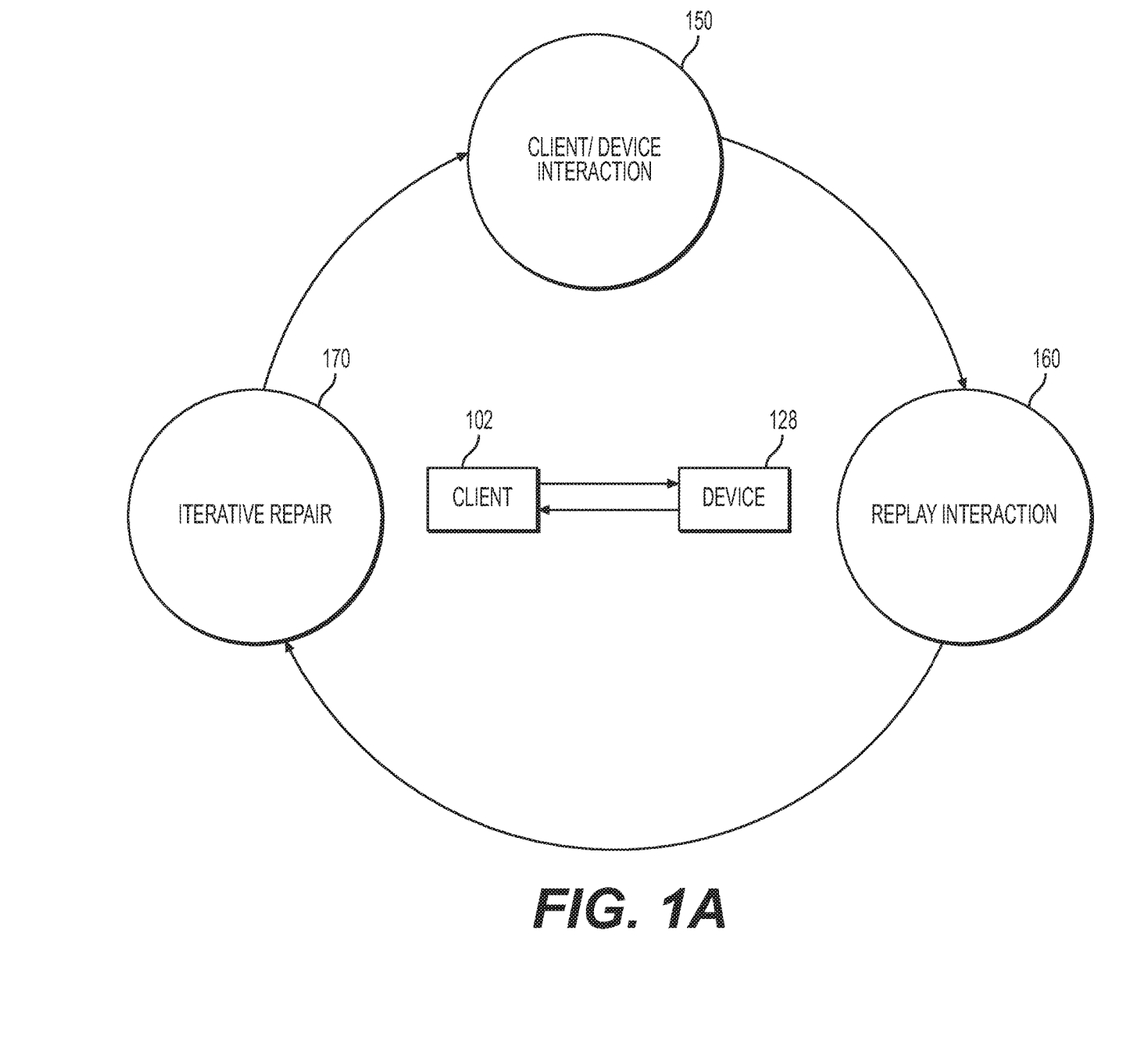
FIG. 1A depicts a flowchart method of replaying interactions between a client and a device, according to one or more embodiments.

As shown in FIG. 1A, there is depicted flowchart method for providing a structured logging of interactions between a client 102 and a device 128. In step 150, the interactions between client 102 and device 128 may be logged as structured events that are correlated to an identifiable tag (e.g., correlation identification (ID)). In step 160, the structured events may then be replayed to recreate the events as they were logged. In step 170, the replayed events may then provide an immediate reproduction of the interactions that led to the communication error between client 102 and device 128. By identifying the circumstances that led up to the unexpected behavior, malformed requests may be iteratively repaired to generated expected responses.

Figure 1B:
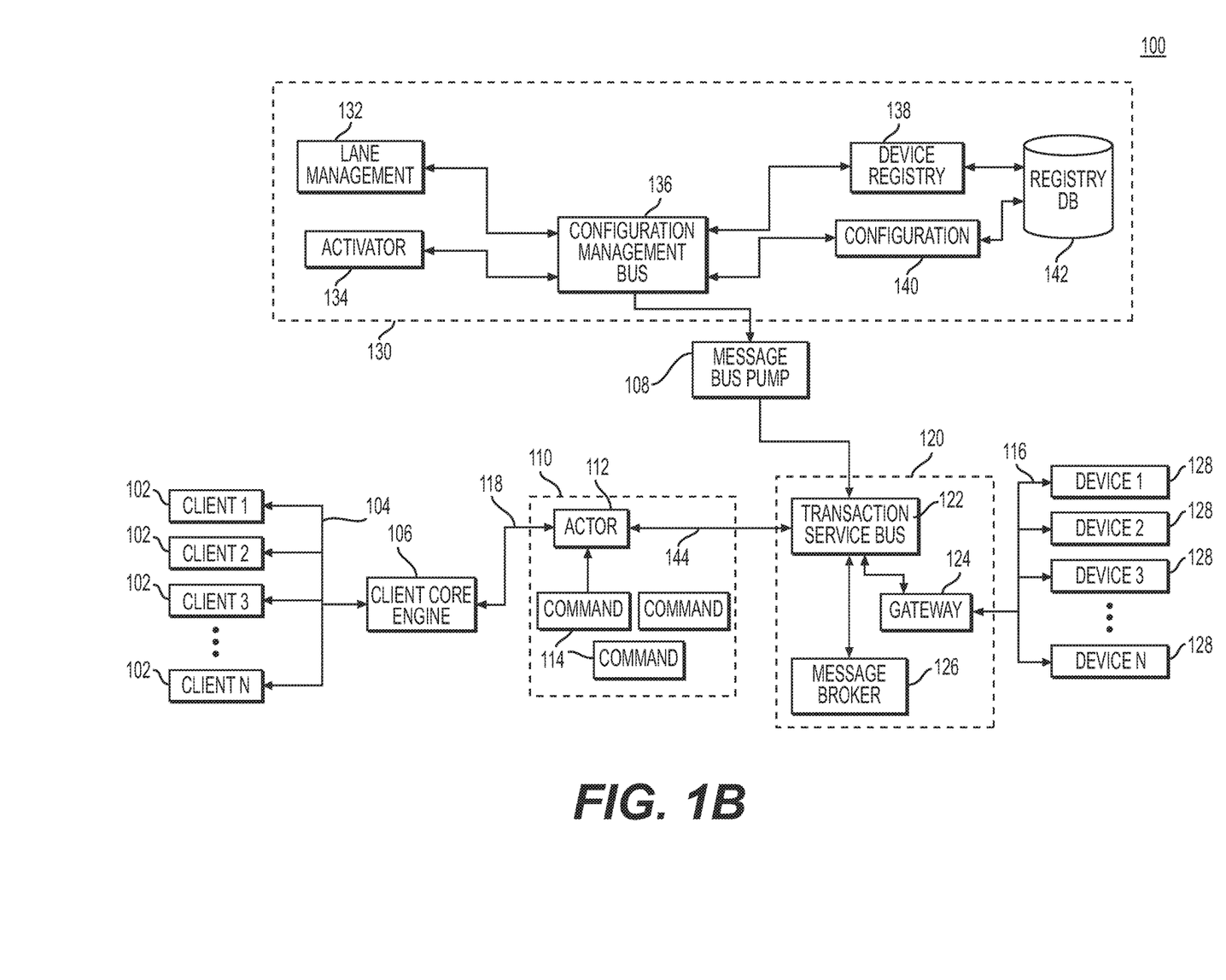
FIG. 1B depicts an exemplary system infrastructure for electronic transactions, according to one or more embodiments.

Turning to FIG. 1B, an infrastructure 100 for processing electronic payment requests may include one or more point of sale (POS) devices, or clients 102, which may be in communication with a client core engine 106, and one or more personal identification number (PIN) pad terminals, or devices 128, which may be in communication with a socket gateway 124. Clients 102 may communicate a sale request message over computer network 104 to client core engine 106. Client core engine 106 may be embodied, for example, as middleware that may transmit commands to control a device 128, such as by sending a payment request to device transaction generator 110 over computer network 118. Device transaction generator 110 may generate one or more commands 114 for processing by a transaction actor 112. Transaction actor 112 may take in a transaction request from the client engine 106 and device specific commands 114 for the transaction. Transaction actor 112 may further take in expected responses from device 128. Transaction actor 112 may manage the entire transaction using, for example, a state machine for the specific transaction.

Infrastructure 100 for processing electronic payment requests may further include a device gateway 120, which may provide communication with devices 128. Device gateway 120 may include a message broker 126 that may process incoming sales transaction messages, a transaction service bus 122, and one or more socket gateways 124.

Infrastructure 100 may further include a configuration management service 130, which may provide configuration services for devices 128. Configuration management service 130 may include a configuration service 140, a device registry 138 and a registry database 142. Configuration service 140 may, if necessary, configure devices 128 upon connection to the infrastructure. Device registry 138 and registry database 142 may maintain data associating each device 128 (e.g., PIN pad) with an account or merchant. Configuration management service 136 may further include a lane management service 132 and a device activator 134.

Infrastructure 100 may be embodied as a semi-integrated solution and may further control the devices (e.g., PIN pads) on behalf of the client (e.g., POS device) software. Such control may include controlling a transaction flow or sequence including, for example, prompting for payment card swipe or insert, sending a transaction request for authorization, prompting for a consumer signature, etc.

Figure 2:
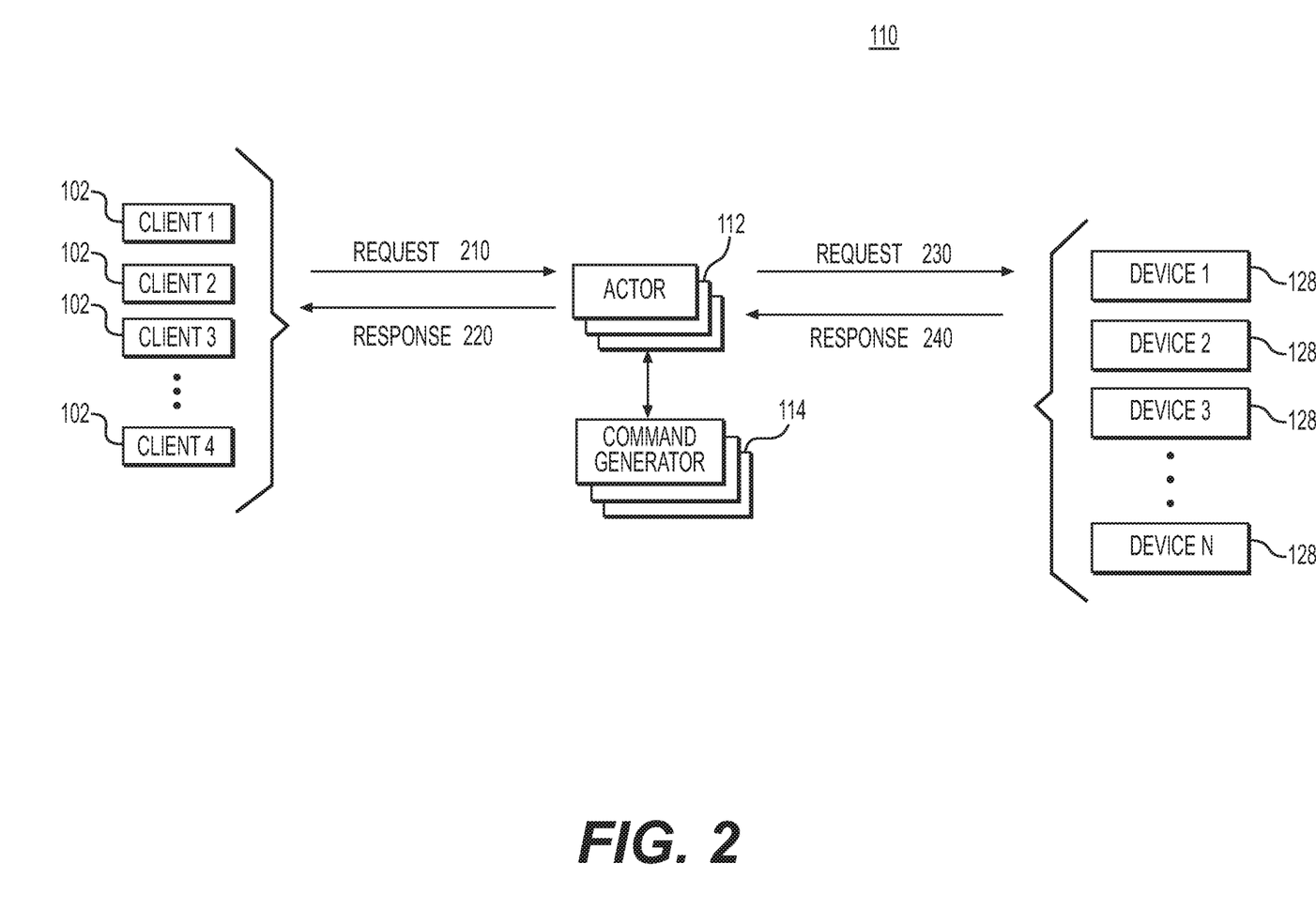
FIG. 2 depicts an exemplary system infrastructure for device command generation, according to one or more embodiments.

Turning to FIG. 2, device transaction generator 110 may receive a transaction request 210 from, for example, a backend service or application, or from a client 102 (e.g., point of sale device). Transaction generator 110 may then determine whether a transaction generator actor 112 is available to service the transaction request. If no transaction generator actor 112 is available to service the transaction request, then device transaction generator 110 may create a new transaction generator actor 112. Transaction generator actor 112 may then create a transaction command generator 114 to generate commands to be transmitted to a device 128 (e.g., PIN pad) for the transaction request. Alternatively, transaction generator actor 112 may select an available transaction command generator 114 from a pool of idle transaction command generators 114. Transaction command generator 114 may generate device commands to be transmitted to a device 128 (e.g., PIN pad), according to the contents of transaction request 210 including, for example, the transaction type and expected responses from client 102. A new transaction request including the generated device commands may be transmitted to device 128 as a transaction request 230. A transaction response 240 may be received from device 128 and further processed by device transaction generator 110 before being transmitted to client 102 as transaction response 220.

The merchant transaction processing system may include any number of clients 102 (e.g., POS devices) and devices 128 (e.g., PIN pads). However, it may be inefficient or inconvenient to maintain a dedicated transaction generator actor 112 and transaction command generator 114 for each of these devices. Accordingly, device transaction generator 110 may generate a new transaction generator actor 112 or transaction command generator 114 only when needed in order to process a transaction request. Device transaction generator 110 may maintain a transaction generator actor 112 and transaction command generator 114 for each active transaction request and may terminate either transaction generator actor 112 or transaction command generator 114 when the associated transaction request has been completed. Alternatively, device transaction generator 110 may maintain a minimum number of transaction generator actors 112 and transaction command generators 114 that may be greater than the number of active transaction requests. This may allow a transaction request to be processed using existing services without the delay of generating a new transaction generator actor 112 or transaction command generator 114. A newly generated transaction generator actor 112 or transaction command generator 114 may remain active even after the associated transaction request is completed, thus increasing the pool of available transaction generator actors 112 and transaction command generators 114. If the number of transaction generator actors 112 and transaction command generators 114 that are not associated with an active transaction requests exceeds a threshold then one or more transaction generator actors 112 or transaction command generators 114 may be terminated in order to free allocated resources.

Generating Structured Logging of Events with Correlation IDs

Figure 3:
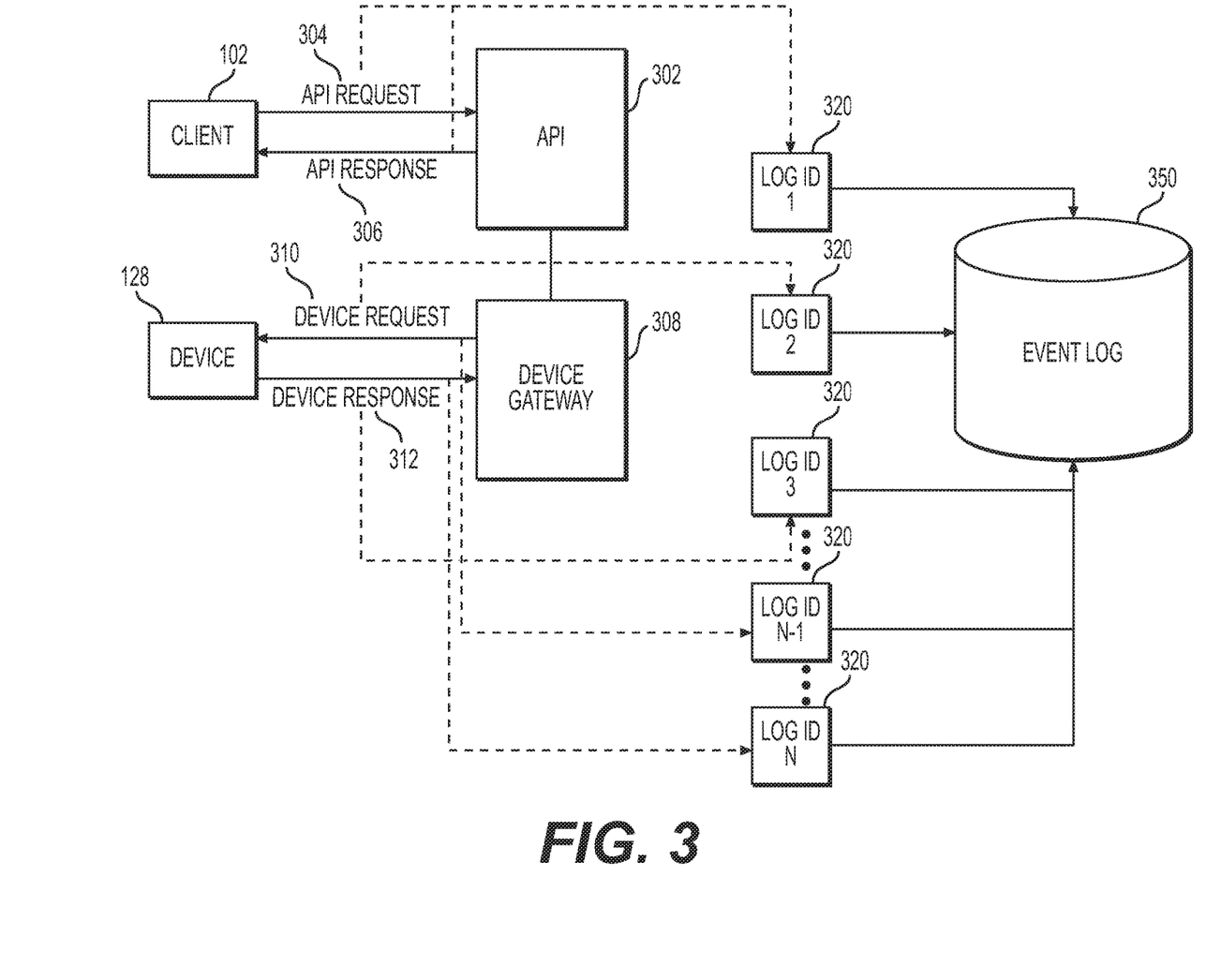
FIG. 3 depicts an exemplary system infrastructure for storing interactions between a client and a device, according to one or more embodiments.

FIG. 3 depicts a communication flow diagram of a method for creating a structured logging of interaction events between a client and a device, according to one or more embodiments. A client 102 may send an Application Program Interface (API) request 304 to an API 302. An API is generally a set of routines, protocols, and tools for building software applications. The API may also specify how software components should interact. API request 304 may be logged as a first event and tagged with a correlation identification (ID) 320. The first event and correlation ID 320 may then be stored in an event log 350. After receiving API request 304, API 302 then may return an API response 306 to client 102. API response 306 may be logged and associated with the first event under correlation ID 320. In other embodiments, API response 306 may be correlated under the same correlation ID but otherwise logged as a separate event from the first event. API 302 may then transmit API request 304 to device 128 as a device request 310 via device gateway 308. Device request 310 may then be logged as a second event and tagged with correlation ID 320. The second event and correlation ID 320 may be stored in event log 350. After receiving device request 310, device 128 may then return a device response 312. Device response may then be logged as a third event and tagged with correlation ID 320. The third event and correlation ID 320 may be stored in event log 350. It is to be appreciated that the communication round-trips between device 128 and device gateway 308 are not limited in number by what is illustrated in FIG. 3. The number of interactions between device 128 and device gateway 308 may be device and event-type specific. In some embodiments, the number of events to be logged and stored in event log 350 may be in the tens or hundreds of events. In other embodiments, the number of events to be logged and stored in event log 350 may be greater than hundreds of events.

Generating Test Definitions from Structured Logging of Events

Figure 4:
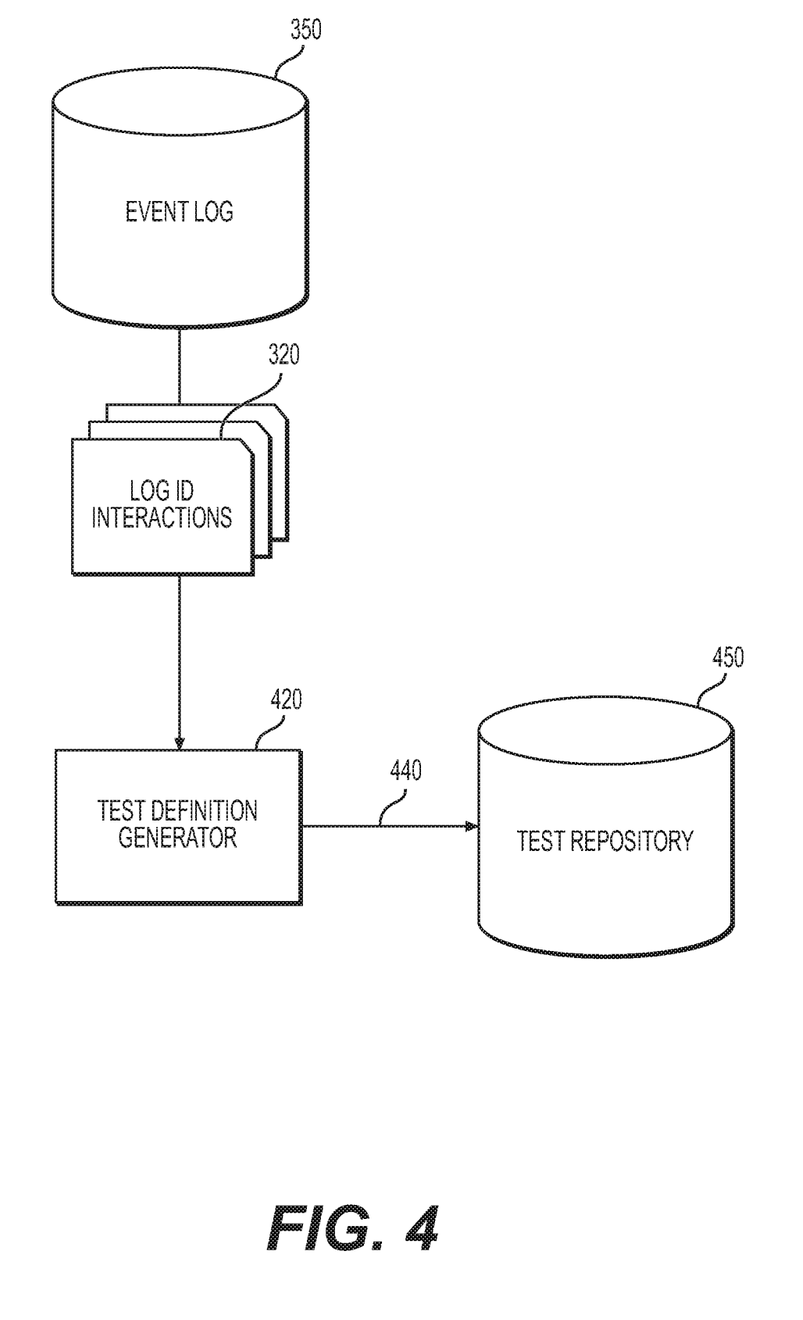
FIG. 4 depicts a communication flow diagram of a method of test definition generation, according to one or more embodiments.

FIG. 4 depicts a communication flow diagram of a method for generating test definitions based on the structured logging of events and correlation IDs, according to one or more embodiments. A test definition generator 420 may receive correlation ID 320 and the structured logging of events from event log 350. Test definition generator 420 may then generate a test definition 440 based on the structured logging of events and correlation ID 320. In other embodiments, test definition generator 420 may generate test definition 440, on demand, based on correlation ID 320 and on any one event stored in event log 350. Test definition 440 may be stored in a test repository 450 which can be accessed for future replays of the structured logging of events.

Simulations Based on Test Definitions

Figure 5:
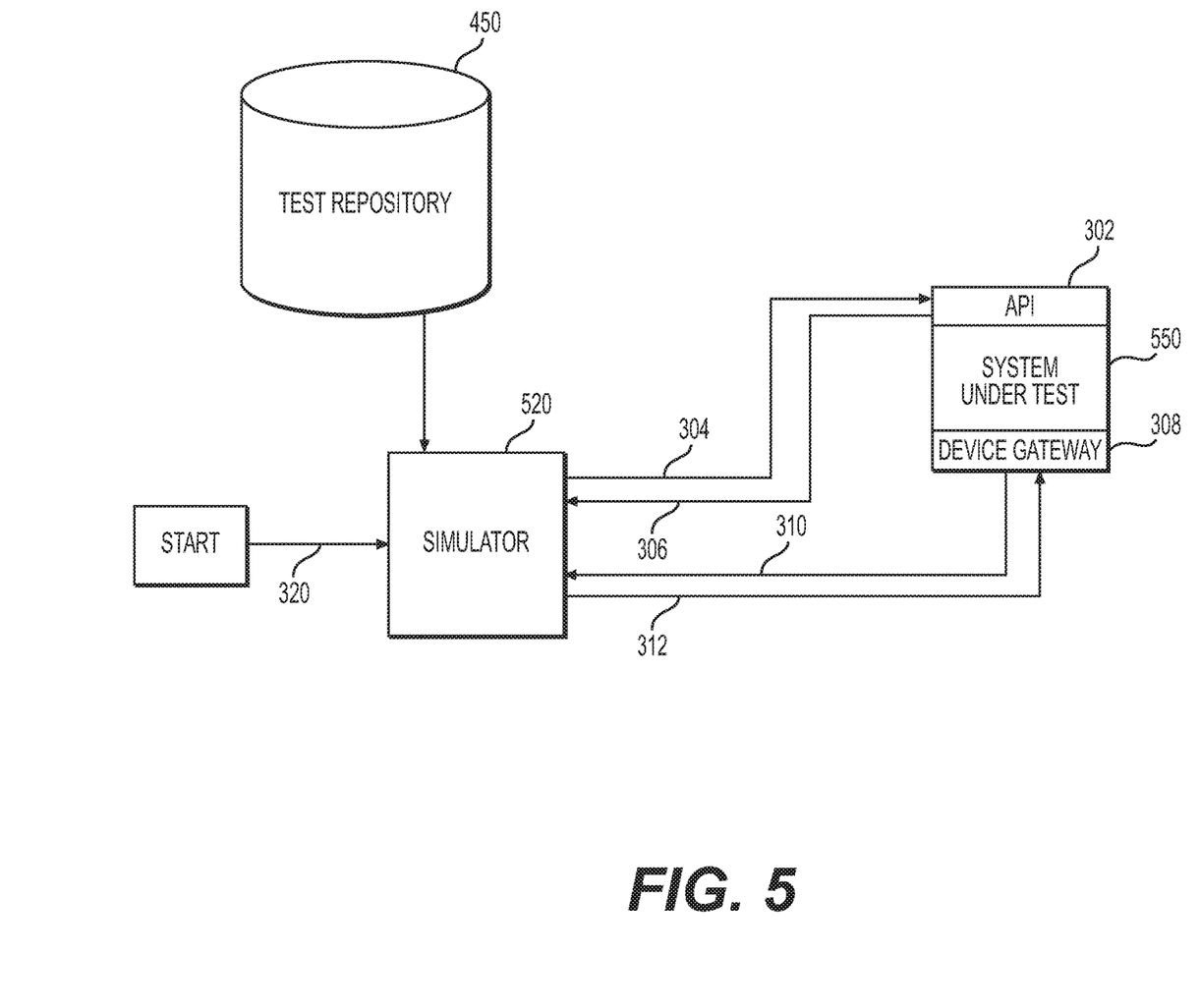
FIG. 5 depicts a communication flow diagram of a method of simulating interactions between a client and device in a system under test, according to one or more embodiments.

FIG. 5 depicts a communication flow diagram of a method of simulating interactions in a system under test 550, according to one or more embodiments. The system under test may include client 102 and device 128. A simulator 520 may then be connected to the system under test 550 to replay the events based on the test definition 440 and the correlation ID 320. Simulator 520 may replay the API request 304 and API response 306 in communication with API 302, and may replay device request 310 and device response 312 in communication with device gateway 308. By replaying the structured logging of events associated with correlation ID 320, the circumstances that led to an unexpected response can be reproduced for remediation. As discussed above with reference to FIG. 3, the number of events that may be replayed by simulator 520 is not intended to be limited by what is illustrated in FIG. 5. In some embodiments, the number of events that may be replayed by simulator 520 may be in the tens or hundreds of events. In other embodiments, the number of events that may be replayed by simulator 520 may be greater than hundreds of events.

Any suitable system infrastructure may be put into place to provide a cloud based device gateway. FIGS. 1B, 2-6 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIGS. 1B and 2-6. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Figure 7:
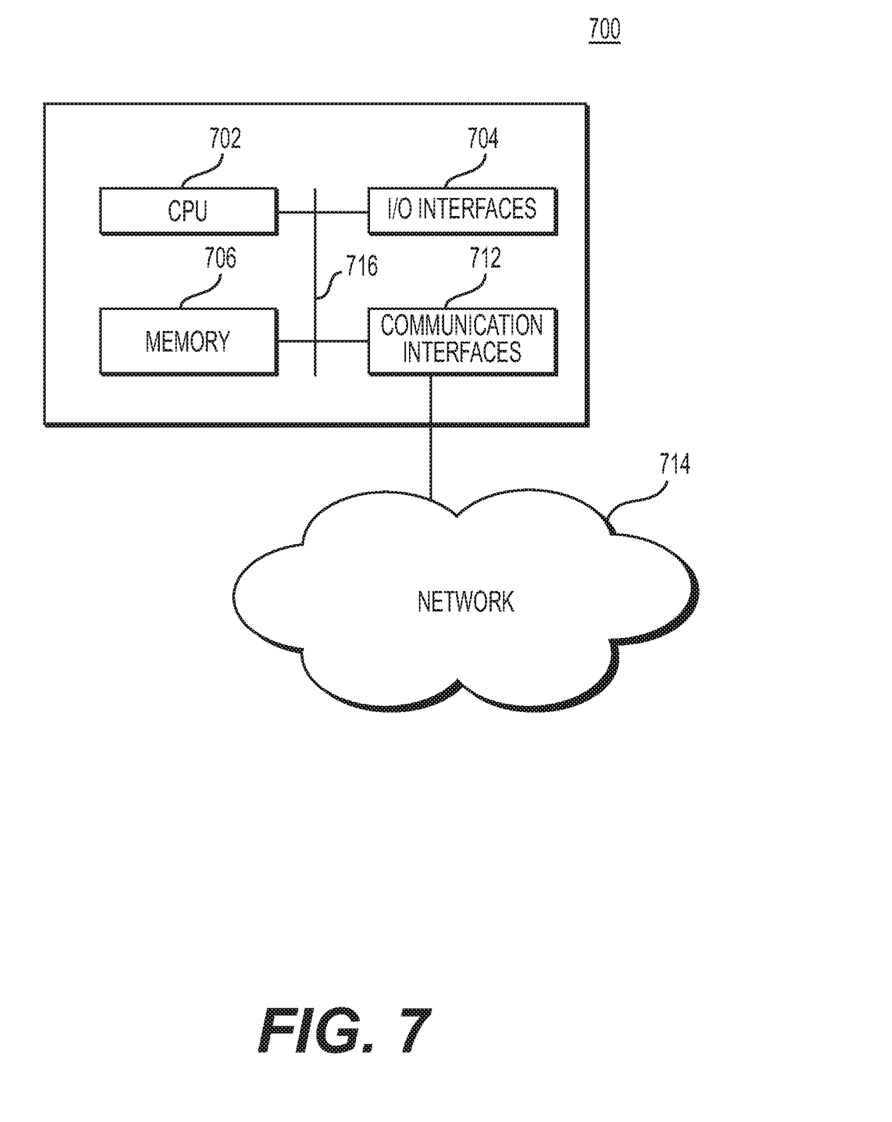
FIG. 7 is a block diagram of an example computing environment, according to one or more embodiments.

The systems and processes described above may be performed on or between one or more computing devices. FIG. 7 illustrates an example computing device. A computing device 700 may be a server, a computing device that is integrated with other systems or subsystems, a mobile computing device such as a smart phone, a cloud-based computing ability, and so forth. The computing device 700 may be any suitable computing device as would be understood in the art, including without limitation, a custom chip, and embedded processing device, a tablet computing device, a POS terminal associated with the merchant 110, a back-office system of a merchant 110, a personal data assistant (PDA), a desktop, laptop, microcomputer, and minicomputer, a server, a mainframe, or any other suitable programmable device. In various embodiments disclosed herein, a single component may be replaced by multiple components and multiple components may be replaced by single component to perform a given function or functions. Except where such substitution would not be operative, such substitution is within the intended scope of the embodiments.

The computing device 700 includes a processor 702 that may be any suitable type of processing unit, for example a general-purpose central processing unit (CPU), a reduced instruction set computer (RISC), a processor that has a pipeline or multiple processing capability including having multiple cores, a complex instruction set computer (CISC), a digital signal processor (DSP), application specific integrated circuits (ASIC), a programmable logic devices (PLD), and a field programmable gate array (FPGA), among others. The computing resources may also include distributed computing devices, cloud computing resources, and virtual computing resources in general.

The computing device 700 also includes one or more memories 706, for example read-only memory (ROM), random access memory (RAM), cache memory associated with the processor 702, or other memory such as dynamic RAM (DRAM), static RAM (SRAM), programmable ROM (PROM), electrically erasable PROM (EEPROM), flash memory, a removable memory card or disc, a solid-state drive, and so forth. The computing device 700 also includes storage media such as a storage device that may be configured to have multiple modules, such as magnetic disk drives, floppy drives, tape drives, hard drives, optical drives and media, magneto-optical drives and media, compact disk drives, Compact Disc Read Only Memory (CD-ROM), compact disc recordable (CD-R), Compact Disk Rewritable (CD-RW), a suitable type of Digital Versatile Disc (DVD) or BluRay disc, and so forth. Storage media such as flash drives, solid-state hard drives, redundant array of individual discs (RAID), virtual drives, networked drives and other memory means including storage media on the processor 702, or memories 706 are also contemplated as storage devices. It may be appreciated that such memory may be internal or external with respect to operation of the disclosed embodiments. It may be appreciated that certain portions of the processes described herein may be performed using instructions stored on a computer readable medium or media that direct computer system to perform the process steps. Non-transitory computable-readable media, as used herein, comprises all computer-readable media except for transitory, propagating signals.

Networking communication interfaces 708 may be configured to transmit to, or receive data from, other computing devices 700 across a network 712. The network and communication interfaces 708 may be an Ethernet interface, a radio interface, a Universal Serial Bus (USB) interface, or any other suitable communications interface and may include receivers, transmitter, and transceivers. For purposes of clarity, a transceiver may be referred to as a receiver or a transmitter when referring to only the input or only the output functionality of the transceiver. Example communication interfaces 708 may include wire data transmission links such as Ethernet and TCP/IP. The communication interfaces 708 may include wireless protocols for interfacing with private or public networks 712. For example, the network and communication interfaces 708 and protocols may include interfaces for communicating with private wireless networks such as Wi-Fi network, one of the IEEE 802.11x family of networks, or another suitable wireless network. The network and communication interfaces 708 may include interfaces and protocols for communicating with public wireless networks 708, using for example wireless protocols used by cellular network providers, including Code Division Multiple Access (CDMA) and Global System for Mobile Communications (GSM). A computing device 700 may use network and communication interfaces 708 to communicate with hardware modules such as a database or data store, or one or more servers or other networked computing resources. Data may be encrypted or protected from unauthorized access.

In various configurations, the computing device 700 may include a system bus 710 for interconnecting the various components of the computing device 700, or the computing device 700 may be integrated into one or more chips such as programmable logic device or application specific integrated circuit (ASIC). The system bus 710 may include a memory controller, a local bus, or a peripheral bus for supporting input and output devices 704, and communication interfaces 708. Example input and output devices 704 include keyboards, keypads, gesture or graphical input devices, motion input devices, touchscreen interfaces, one or more displays, audio units, voice recognition units, vibratory devices, computer mice, and any other suitable user interface.

The processor 702 and memory 706 may include non-volatile memory for storing computable-readable instructions, data, data structures, program modules, code, microcode, and other software components for storing the computer-readable instructions in non-transitory computable-readable mediums in connection with the other hardware components for carrying out the methodologies described herein. Software components may include source code, compiled code, interpreted code, executable code, static code, dynamic code, encrypted code, or any other suitable type of code or computer instructions implemented using any suitable high-level, low-level, object-oriented, visual, compiled, or interpreted programming language.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of simulating device state changes in an integrated system, wherein the integrated system comprises a first device and a second device, the method comprising:
   receiving a transaction request indicating a transaction type from the first device;
   storing the transaction request as a first event in an event log, wherein the first event is associated with a correlation ID;
   transmitting the transaction request to the second device;
   storing the transmission of the transaction request as a second event in the event log, wherein the second event is associated with the correlation ID;
   receiving a device response from the second device;
   storing the device response as a third event in the event log, wherein the third event is associated with the correlation ID;
   generating a test definition ID based on the correlation ID and the first event, and storing the test definition ID in a test repository; and
   when the integrated system is under test, transmitting the correlation ID and the test definition ID to a simulator to replay the first event in the integrated system under test based on the test definition ID and the correlation ID.

2. The method of claim 1, wherein the transaction request further comprises an API request, and wherein the API request generates an API response for the first device.

3. The method of claim 1, wherein the transaction request is transmitted to the second device via a device gateway.

4. The method of claim 3, wherein the second device is a terminal device.

5. The method of claim 4, wherein the terminal device is a personal identification number (PIN) pad.

6. The method of claim 1, wherein generating the test definition ID is based on the correlation ID and a set of events, wherein the set of events includes the first event and the second event, and wherein the simulator replays the set of events in the integrated system under test.

7. The method of claim 6, wherein generating the test definition ID is based on the correlation ID and a set of events, wherein the set of events includes the first event, the second event, and the third event, and wherein the simulator replays the set of events in the integrated system under test.

8. A computer system for simulating device state changes in an integrated system, wherein the integrated system comprises a first device and a second device, the system comprising:
   a memory having processor-readable instructions stored therein; and
   a processor configured to access the memory and execute the processor-readable instructions, which when executed by the processor configures the processor to perform a plurality of functions, including functions to:
   receive a transaction request indicating a transaction type from the first device;
   store the transaction request as a first event in an event log, wherein the first event is associated with a correlation ID;
   transmit the transaction request to the second device;
   store the transmission of the transaction request as a second event in the event log, wherein the second event is associated with the correlation ID;
   receive a device response from the second device;
   store the device response as a third event in the event log, wherein the third event is associated with the correlation ID;
   generating a test definition ID based on the correlation ID and the first event, and storing the test definition ID in a test repository; and
   when the integrated system is under test, transmitting the correlation ID and the test definition ID to a simulator to replay the first event in the integrated system under test based on the test definition ID and the correlation ID.

9. The computer system of claim 8, wherein the transaction request further comprises an API request, and wherein the API request generates an API response for the first device.

10. The computer system of claim 8, wherein the transaction request is transmitted to the second device via a device gateway.

11. The computer system of claim 10, wherein the second device is a terminal device.

12. The computer system of claim 11, wherein the terminal device is a personal identification number (PIN) pad.

13. The computer system of claim 8, wherein generating the test definition ID is based on the correlation ID and a set of events, wherein the set of events includes the first event and the second event, and wherein the simulator replays the set of events in the integrated system under test.

14. The computer system of claim 13, wherein generating the test definition ID is based on the correlation ID and a set of events, wherein the set of events includes the first event, the second event, and the third event, and wherein the simulator replays the set of events in the integrated system under test.

15. A non-transitory computer readable medium storing a program causing a computer to execute a method of simulating device state changes in an integrated system, wherein the integrated system comprises a first device and a second device, the method comprising:
    receiving a transaction request indicating a transaction type from the first device;
    storing the transaction request as a first event in an event log, wherein the first event is associated with a correlation ID;
    transmitting the transaction request to the second device;
    storing the transmission of the transaction request as a second event in the event log, wherein the second event is associated with the correlation ID;
    receiving a device response from the second device;
    storing the device response as a third event in the event log, wherein the third event is associated with the correlation ID;
    generating a test definition ID based on the correlation ID and the first event, and storing the test definition ID in a test repository; and
    when the integrated system is under test, transmitting the correlation ID and the test definition ID to a simulator to replay the first event in the integrated system under test based on the test definition ID and the correlation ID.

16. The non-transitory computer readable medium according to claim 15, wherein the transaction request further comprises an API request, and wherein the API request generates an API response for the first device.

17. The non-transitory computer readable medium according to claim 15, wherein the transaction request is transmitted to the second device via a device gateway.

18. The non-transitory computer readable medium according to claim 15, wherein the second device is a terminal device.

19. The non-transitory computer readable medium according to claim 15, wherein generating the test definition ID is based on the correlation ID and a set of events, wherein the set of events includes the first event and the second event, and wherein the simulator replays the set of events in the integrated system under test.

20. The non-transitory computer readable medium according to claim 19, wherein generating the test definition ID is based on the correlation ID and a set of events, wherein the set of events includes the first event, the second event, and the third event, and wherein the simulator replays the set of events in the integrated system under test.

* * * * *